(12) United States Patent
Linihan (10) Patent No.: US 10,744,690 B2
(45) Date of Patent: Aug. 18, 2020

(54) APPLYING CYMATICS RESONANT FREQUENCIES FOR PARTICLE DISTRIBUTION AND MEANS OF CAPTURING FOR PROCESSING

(71) Applicant: EALNILAM, INC., Oakland Township, MI (US)

(72) Inventor: Michael G. Linihan, Oakland Township, MI (US)

(73) Assignee: EALNILAM, INC., Stevensville, MI (US)

( * ) Notice: Subject to any disclaimer, the term of this patent is extended or adjusted under 35 U.S.C. 154(b) by 370 days.

(21) Appl. No.: 15/725,481

(22) Filed: Oct. 5, 2017

(65) Prior Publication Data
US 2019/0105818 A1  Apr. 11, 2019

(51) Int. Cl.
| | | |
|---|---|---|
| G01H 17/00 | (2006.01) | |
| B29C 45/14 | (2006.01) | |
| B22F 5/00 | (2006.01) | |
| B06B 1/02 | (2006.01) | |
| B29L 31/34 | (2006.01) | |
| B29K 705/00 | (2006.01) | |

(52) U.S. Cl.
CPC ............... *B29C 45/14* (2013.01); *B06B 1/02* (2013.01); *B22F 5/00* (2013.01); *B29C 45/14221* (2013.01); *B29C 45/14811* (2013.01); *G01H 17/00* (2013.01); *B29C 45/14778* (2013.01); *B29C 45/14786* (2013.01); *B29C 2791/008* (2013.01); *B29K 2705/00* (2013.01); *B29K 2995/0001* (2013.01); *B29K 2995/0011* (2013.01); *B29L 2031/3456* (2013.01)

(58) Field of Classification Search
None
See application file for complete search history.

(56) References Cited

U.S. PATENT DOCUMENTS

| | | | | |
|---|---|---|---|---|
| 6,413,360 | B1 * | 7/2002 | Morita | ................ B32B 37/1292 |
| | | | | 156/379.8 |
| 6,485,596 | B1 * | 11/2002 | Toyoda | ................. B29C 31/006 |
| | | | | 156/230 |
| 2006/0283539 | A1 * | 12/2006 | Slafer | ...................... B05D 1/28 |
| | | | | 156/230 |

OTHER PUBLICATIONS

Harada, Cesar, "How to Make a Chladni Plate", 2012 (Year: 2012).*

* cited by examiner

*Primary Examiner* — Jeffrey M Wollschlager
*Assistant Examiner* — Armand Melendez
(74) *Attorney, Agent, or Firm* — Shumaker, Loop & Kendrick, LLP; John A. Miller (57) ABSTRACT

Methods for creating nodal vibration patterns in a granular material on a metal sheet, capturing the patterns in a working material and using the working material with the captured shapes to provide an end product. A tone is applied to the metal sheet which, based on the properties of the sheet and the tone frequency, create a specific pattern of nodal lines of vibration in the sheet. A particulate material placed on the sheet takes the shape of the nodal lines. An adhesive-coated sheet of working material is applied to the metal sheet and captures the particles in the shape of the nodal lines. The sheet of working material with the captured nodal line patterns is then used to produce a structure with strength, stiffness and other properties based on the embedded wave patterns. Alternately, the particles can be directly fused into a skeleton in the nodal line pattern shape.

12 Claims, 4 Drawing Sheets

APPLYING CYMATICS RESONANT FREQUENCIES FOR PARTICLE DISTRIBUTION AND MEANS OF CAPTURING FOR PROCESSING

BACKGROUND

Field

The present disclosure relates generally to capturing shape patterns which are induced in a vibrating sheet of metal and, more particularly, to processes and apparatuses for creating specific patterns of nodal lines of vibration in a granular material on a metal sheet or other membrane, and capturing the nodal line patterns in a working material, where the working material can then be processed to produce a laminated structure or other product with specific physical characteristics based on the nodal line patterns.

Discussion of the Related Art

Cymatics is a term given to the study of certain modal vibrational phenomena. In a typical cymatics example, a thin metallic plate, diaphragm or membrane is vibrated by exposing it to a sound tone at a certain frequency, and regions of maximum and minimum displacement in the plate are made visible in a thin coating of particles, paste or liquid. Different patterns emerge in the excitatory medium depending on the geometry of the plate and the driving frequency.

Although the modal vibrational phenomena was first observed centuries ago, and the physics behind the vibrations patterns has been understood for some time, the nodal patterns themselves have always been treated simply as something interesting to look at—that is, as a form of artwork, or as a visualization of a physical principle. Until now, there has not been a way to permanently capture the intricate shapes of the nodal lines in a working material, and use the working material to provide a structural end product.

It has been determined that the nodal patterns of vibration can be captured using a variety of processes and materials, and the captured shapes used as end products or as intermediates in producing other products.

SUMMARY

The present disclosure describes methods and apparatuses for creating nodal vibration patterns in a granular material on a metal sheet, capturing the patterns in a working material and using the working material with the captured shapes to provide an end product. The metal sheet has a size, shape, thickness and material properties chosen to suit a particular application. One or more aural tone frequencies are applied to the metal sheet which, based on the properties of the sheet and the frequency, create a specific pattern of nodal lines of vibration in the sheet. A particulate or granular material placed on the sheet will take the shape of the nodal lines. An adhesive-coated sheet of a working material is applied to the metal sheet and captures the granular material in the shape of the nodal lines. The sheet of working material with the captured nodal line patterns is then used, alone or in combination with other parts, to produce a structure with intricate strength, stiffness and other properties based on the embedded wave patterns. Alternately, the granular material can be directly fused into a skeleton in the shape of the nodal lines.

Additional features of the present disclosure will become apparent from the following description and appended claims, taken in conjunction with the accompanying drawings.

BRIEF DESCRIPTION OF THE DRAWINGS

FIG. 1A is an illustration of a cymatics apparatus including a tone generator and a resonating plate, according to a technique known in the art;

FIGS. 1B/1C/1D are illustrations of other shapes which may be used as the resonating plate in the cymatics apparatus of FIG. 1A;

FIG. 2 is an illustration of the known cymatics apparatus of FIG. 1A where a granular material has been added on top of the resonating plate;

DETAILED DESCRIPTION OF THE EMBODIMENTS

The following discussion of the embodiments of the disclosure directed to applying cymatics resonant frequencies for particle distribution and means of capturing for processing is merely exemplary in nature, and is in no way intended to limit the disclosure or its applications or uses.

Cymatics is a term used to describe nodal patterns created in a sheet of a material when subjected to vibration at a particular frequency. In a traditional demonstration of cymatics, a metal sheet is constrained at its center, covered with a light dusting of particles of a granular material and subjected to vibration (usually by sound waves) at a particular frequency. When subjected to the sound waves or vibration at a resonant frequency, the sheet responds by taking the shape of a particular normal mode of vibration associated with the frequency, and the nodal lines (the places on the sheet where the vibration amplitude is zero) become visible as the granular material collects in the nodal lines. The normal modes of vibration for particular frequencies, and the pattern of nodal lines associated with each of these, are completely determined, for a surface with homogeneous mechanical characteristics, from the geometric shape of the surface and by the way in which the surface is constrained.

Although the nodal pattern shapes were first observed centuries ago, and the physics associated with the vibrations has long been understood, the shapes have traditionally been nothing more than physics-based artwork. Until now, there has been no technique to capture the nodal pattern shapes in a three-dimensional structure (the two dimensions of the plate, and a small thickness of the nodal line pattern) and use the structure as an end product or to produce an end product.

FIG. 1A is an illustration of a cymatics apparatus 10 according to a technique known in the art. The cymatics apparatus 10 includes a tone generator 12, a speaker 14 and speaker wires 16 connecting the speaker 14 to the tone generator 12. The tone generator 12 is configured (with a dial or by any other control means including computer) to produce a tone at a particular frequency. The speaker wires 16 deliver signals to the speaker 14, which produces a sound at the particular frequency. The apparatus 10 also includes a resonating plate 20 which, in one typical example, is fixed at a center mounting point 18 and is located directly above but not touching the speaker 14.

When the speaker 14 produces the aural tone at the particular frequency, the resonating plate 20 vibrates in response to the sound waves. When the particular frequency corresponds to one of the (many) natural frequencies of vibration of the resonating plate 20, the plate 20 responds by taking the shape of a pattern of nodal lines of vibration corresponding to the particular frequency. The resonating plate 20 will have many different resonant frequencies and each resonant frequency will have a different nodal line pattern, where the nodal line patterns become more complex and intricate at higher resonant frequencies, as discussed below and shown in later figures. Rather than sound waves from the speaker 14, the resonating plate 20 could be excited by mechanical vibration in any manner in which the vibration frequency can be controlled.

FIGS. 1B/1C/1D are illustrations of other shapes which may be used as the resonating plate in the cymatics apparatus 10. FIG. 1B is an oval plate 22, FIG. 1C is a triangular plate 24 and FIG. 1D is a round plate 26. These figures are just examples to illustrate that virtually any geometric shape may be used for the resonating plate in the cymatics apparatus 10. Other examples include regular n-polygons such as pentagons, hexagons, etc., star shapes and so forth. Shapes which have rotational or mirror symmetry about the center mounting point 18 tend to produce nodal line patterns which also have such symmetry. The plates 20-28 may be any size suitable for a particular application, from just a few inches across up to much larger sizes.

FIG. 2 is an illustration of the cymatics apparatus 10 where a granular material comprised of particles 30 has been added on top of the resonating plate 20. The particles 30 can be any suitable granular substance, such as salt, seeds, fine sand, particles of plastic or metal, etc. The particles 30 can be placed in a pile near the center of the plate 20, or the particles 30 can be sprinkled over the surface of the plate 20. Either way, the particles 30 will quickly find their way to the zero displacement nodal lines when the tone is applied and the plate 20 resonates at one of its natural frequencies.

FIG. 3A is an illustration of the cymatics apparatus 10 where the tone generator 12 has been activated, the speaker 14 (not shown in FIGS. 2 and 3A) produces a sound at a natural frequency of the plate 20, and the particles 30 have taken the shape of a nodal line pattern 32. The nodal line pattern 32 in FIG. 3A is the shape of one of the lowest natural frequencies of the resonating plate 20. To be clear about what is happening—the plate 20 resonates in a shape corresponding to the frequency produced by the tone generator 12 and the speaker 14. The shape is determined by the size and shape of the plate 20, the constraints on the plate 20 and the frequency. All parts of the plate 20 are vibrating up and down at various amplitudes except for the places which are located on the nodal line pattern 32, which have zero amplitude. Once the plate 20 responds to a resonant frequency, the particles 30 quickly migrate to the nodal lines which are not moving up and down.

FIG. 3B is a cross-sectional illustration of the resonating plate 20 and the nodal line pattern 32 of the particles 30 from the cymatics apparatus 10 of FIG. 3A. The vertical distances in FIG. 3B are exaggerated for visual effect. In the cross-sectional view of FIG. 3B, it can be seen that the plate 20 has taken on a wavy shape, and the particles 30 have collected into the nodal line pattern 32.

FIG. 4 is an illustration of a cymatics capture apparatus 40 including the tone generator 12, the speaker 14, the wires 16 and the resonating plate 20. The capture apparatus 40 also includes a pick-up sheet 50 to capture the shape of the nodal line pattern 32, according to an embodiment of the present disclosure. When the plate 20 is resonating at the applied frequency and producing a desired shape of the nodal line pattern 32, the pick-up sheet 50 is lowered down onto the top surface of the plate 20 and the particles 30 stick to the pick-up sheet 50, thereby capturing the shape of the nodal line pattern 32 for further usage, as discussed below. The pick-up sheet 50 can be any suitable material with a sticky or tacky face, similar to flypaper. Coatings on the pick-up sheet 50 could include various adhesives such as glue, cement or paste, or any other material to which the particles 30 will stick. The pick-up sheet 50 can be a thin paper product or it can be a foam product with some thickness and compressibility to more readily conform to the shapes of the resonating plate 20 and the nodal line pattern 32.

The apparatus 40 can be used to capture multiple different shapes by applying a tone at a first resonant frequency, capturing the nodal line pattern 32 on the pick-up sheet 50, lifting the pick-up sheet 50 off the resonating plate 20 and adding more of the particles 30, applying a tone at a second resonant frequency and capturing the different shape superimposed on the shape of the first nodal line pattern 32, and repeating as many times as desired.

Figure 4:
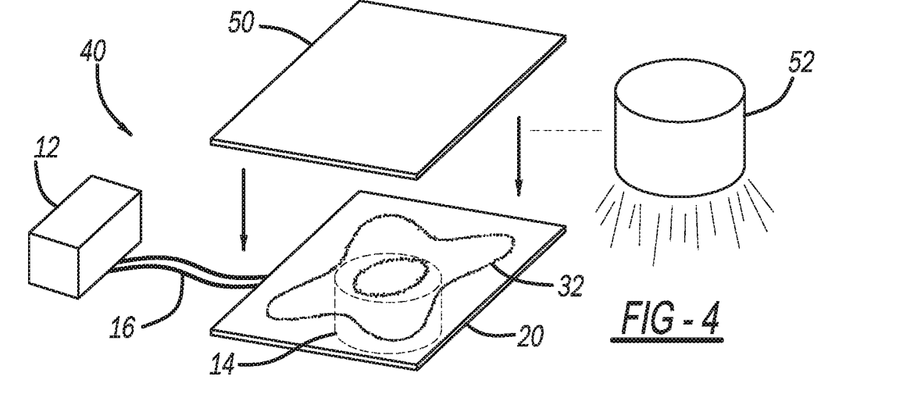
FIG. 4 is an illustration of a cymatics capture apparatus including a tone generator, a resonating plate and a pick-up sheet to capture the shape of the nodal line pattern, according to an embodiment of the present disclosure.

In another embodiment of the present disclosure, the particles 30 are a material which can be melted, such as plastic, and a heat source 52 is provided. In FIG. 4, the heat source 52 is shown off to the side, but in an actual implementation, the heat source 52 would be directly above the resonating plate 20, in place of the pick-up sheet 50. When the plate 20 is resonating at the applied frequency and producing a desired shape of the nodal line pattern 32, the heat source 52 is turned on to melt the particles 30. After the particles 30 have melted sufficiently to stick together, the heat source 52 is turned off. The plate 20 is allowed to cool, either naturally or with the aid of a flow of cooling air, a liquid mist, etc., until the particles 30 have solidified in the shape of the nodal line pattern 32. The solid "skeleton" of the nodal line pattern 32 can then be processed as discussed further below. In this embodiment, the particles 30 can be any suitable material, such as thermoplastic, wax, etc. The heat source 52 may be any suitable heat lamp, such as an infrared lamp.

Figure 5:
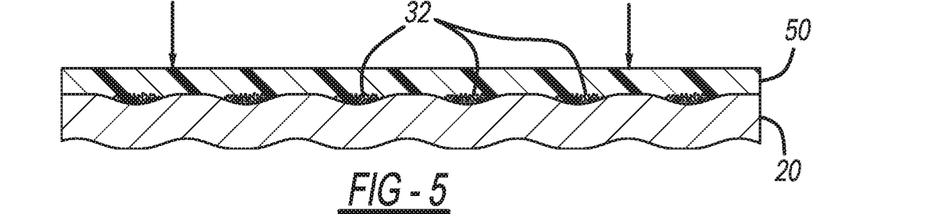
FIG. 5 is a cross-sectional illustration of the resonating plate, the nodal line pattern of the granular material and the pick-up sheet from the cymatics capture apparatus of FIG. 4.

FIG. 5 is a cross-sectional illustration of the resonating plate 20, the nodal line pattern 32 of the particles 30 and the pick-up sheet 50 from the cymatics capture apparatus 40 of FIG. 4. FIG. 5 illustrates that the plate 20 is resonating and the particles 30 have collected in the nodal line pattern 32, which appears as a set of six small scallops in cross section. The pick-up sheet 50 is lowered down on top of the resonating plate 20, capturing the particles 30 in this condition.

Figure 6:
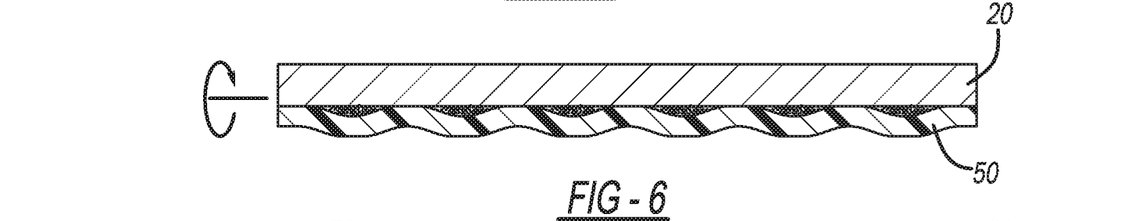
FIG. 6 is a cross-sectional illustration of the cymatics capture apparatus of FIG. 5 after the tone generator has been deactivated and the resonating plate and the pick-up sheet have been flipped over.

FIG. 6 is a cross-sectional illustration of the cymatics capture apparatus 40 after the tone generator 12 has been deactivated and the resonating plate 20 and the pick-up sheet 50 have been flipped over, which is a next step in the preferred process embodiment. It can be seen that the resonating plate 20 has returned to its flat shape, and the particles 30 are still in the same location, trapped by the pick-up sheet 50, which now has a wavy pattern as it conforms to the shape of the nodal line pattern 32. Although the particles 30 appear as small piles in the cross-sectional view of FIG. 6, it should be remembered that the particles 30 actually form the nodal line pattern 32 as illustrated in FIG. 4. The resonating plate 20 and the pick-up sheet 50 are flipped over so that the particles 30 will remain in position when the resonating plate 20 is removed from the pick-up sheet 50, which is the next step. It is important that the resonating plate 20 has a non-stick surface so that it can easily be removed from the pick-up sheet 50.

Figure 7:
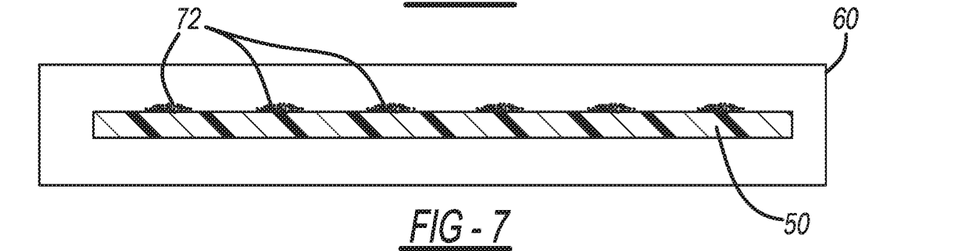
FIG. 7 is a cross-sectional illustration of the pick-up sheet and the nodal line pattern of FIG. 6, where the pick-up sheet with the granular material have been placed in an oven after the resonating plate has been removed.

FIG. 7 is a cross-sectional illustration of the pick-up sheet 50 and the nodal line pattern 32 of FIG. 6, where the pick-up sheet 50 with the particles 30 have been placed in an oven 60 after the resonating plate 20 has been removed. The oven 60 melts the particles 30 so that, after cooling, the particles 30 form a solid skeleton 72 in the shape of the nodal line pattern 32. Where the heat source 52 of FIG. 4 can only be used to melt particles having a low melting temperature such as plastic or wax, the oven 60 can be used for much higher temperature applications—including sintering metal powder or granules. Regardless of the material of the particles 30, after heating in the oven 60, the nodal line pattern 32 has been produced in a solid form as the solid skeleton 72.

The pick-up sheet 50 may remain intact or may itself melt away in the oven 60, depending on the temperature to which it is subjected. If the pick-up sheet 50 remains intact in the oven 60, then the solid skeleton 72 can be removed from the pick-up sheet 50 in a subsequent step, or the solid skeleton 72 can be left attached to the pick-up sheet 50 and they can be used together in a composite lay-up.

Figures 1A, 1B, 1C, 1D, 2:
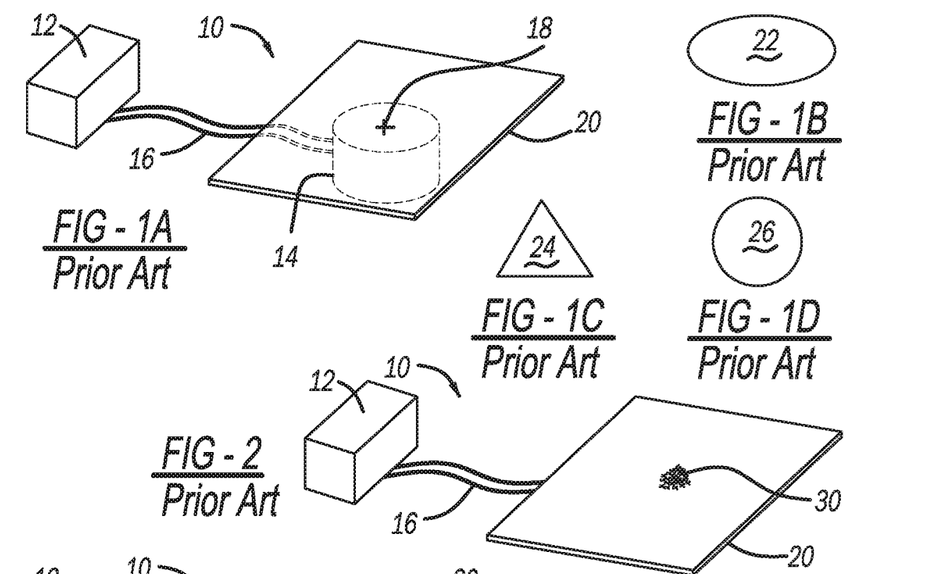
Figures 3A, 3B:
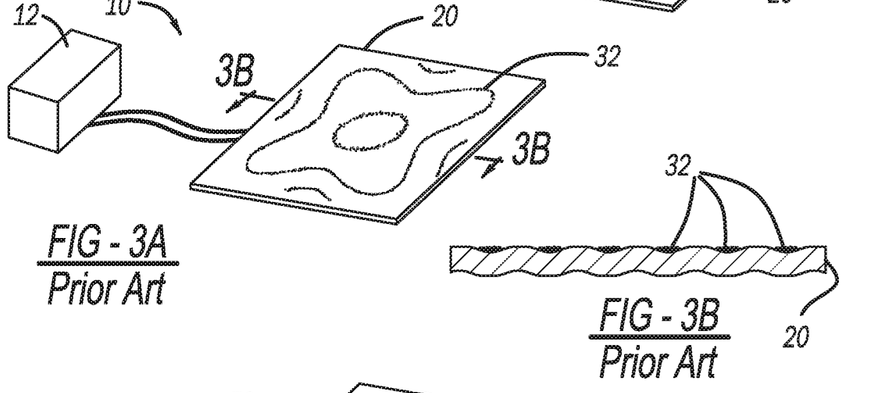
FIG. 3A is an illustration of the known cymatics apparatus of FIG. 2 where the tone generator has been activated and the granular material has taken the shape of a nodal line pattern.
FIG. 3B is a cross-sectional illustration of the resonating plate and the nodal line pattern of the granular material from the cymatics apparatus of FIG. 3A.
Figures 8, 9, 10:
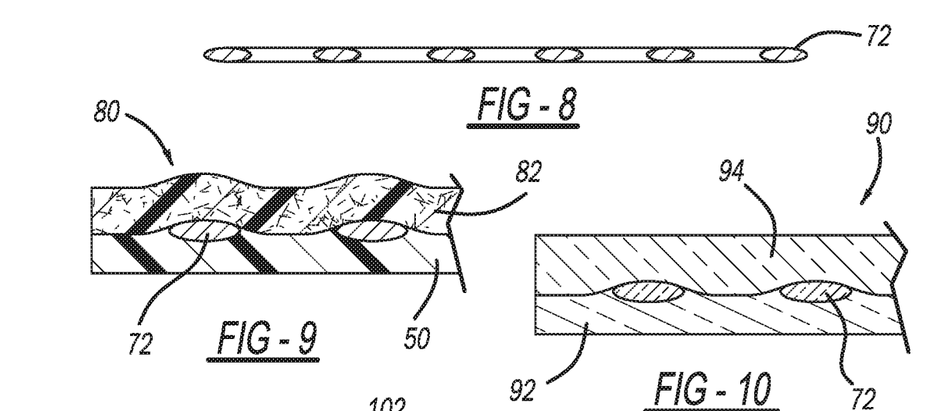
FIG. 8 is a cross-sectional illustration of a skeletal shape created by sintering, melting or fusing the granular material in the nodal line pattern of FIGS. 4-7.
FIG. 9 is a cross-sectional illustration of a composite material layup comprising the pick-up sheet and solid skeletal shape of FIGS. 7-8 combined with a layer of carbon-fiber material.
FIG. 10 is a cross-sectional illustration of a composite material layup comprising the solid skeletal shape of FIG. 8 sandwiched between two layers of glass-fiber material.

FIG. 8 is a cross-sectional illustration of the solid skeleton 72 created by sintering, melting or fusing the particles 30 in the nodal line pattern 32 as shown in FIGS. 4-7. As mentioned earlier, the solid skeleton 72 may be formed directly on the resonating plate 20 by melting the particles 30 with the heat source 52, or the skeleton 72 may be created (with or without the pick-up sheet 50 attached) by processing through the oven 60. Also, as apparent from the shape of the nodal line pattern 32 of FIGS. 3B and 4, and from later figures, the skeleton 72 may comprise multiple pieces or it may be one fully-interconnected structure.

FIG. 9 is a cross-sectional illustration of a composite material layup 80 comprising the pick-up sheet 50 with attached skeleton 72 of FIG. 7 combined with a layer 82 of carbon-fiber material. In this embodiment, the carbon-fiber layer 82 provides most of the structural stiffness and strength. The main purpose of the cymatics-generated skeleton 72 is to provide an intricate shape to the carbon-fiber layer 82—particularly a pattern of ridges which create an increased and customizable bending stiffness and strength profile. The skeleton 72 may or may not provide an appreciable amount of bending stiffness/strength to the layup 80, depending on the material of which the skeleton 72 is comprised, where a metallic material for the skeleton 72 would provide more strength and stiffness than a plastic material.

In another embodiment, carbon fibers could be used as the particles 30. Depending on the length of the fibers, they may take on a random orientation or a length-wise orientation when they form into the nodal line pattern 32. A liquid or gel-type matrix material could be applied to the sheet 20 when resonating, and the apparatus left active while the matrix material solidifies, whereby the carbon-fiber material would be formed directly into the skeleton 72. Alternately, the carbon-fiber particles 30 could be captured by the pick-up sheet 50 and used in a subsequent processing step to create a composite sheet including the carbon fibers.

FIG. 10 is a cross-sectional illustration of a composite material layup 90 comprising the skeleton 72 of FIG. 8 sandwiched between two layers (92,94) of glass-fiber material. In this embodiment, the strength and stiffness of the layup 90 would be contributed to by both the skeleton 72 and the glass-fiber layers 92/94. The layup 90 would be ideal as a "pre-preg" composite, that is, a composite layup sheet which is pre-impregnated with a thermoset polymer matrix material, such as epoxy, and ready to be formed into a final product which would have customized stiffness and strength properties due to the presence of the skeleton 72. This type of usage is shown in a later figure and discussed further below.

Figure 11:
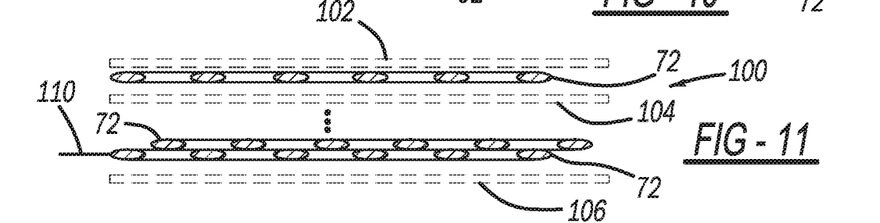
FIG. 11 is a cross-sectional illustration of a composite material layup comprising multiple pieces of the solid skeletal shape of FIG. 8 combined with multiple layers of other materials, and also including an electrical or electronic connection to one of the solid skeletal shapes.

FIG. 11 is a cross-sectional illustration of a composite material layup 100 comprising multiple layers. The layup 100 includes multiple layers (102,104,106) of materials such as carbon-fiber or glass-fiber combined with three of the skeletons 72. More or fewer than three each of the skeletons 72 and the layers 102/104/106 could be used, and the numbers of each need not be equal. Also, in FIG. 11, two of the skeletons 72 are shown as being adjacent in the stack, and offset from each other laterally. Many other permutations are possible, including several of the skeletons 72 adjacent to each other, offset or aligned, etc. The idea is that, with the skeletons 72 and their intricate shapes, it is possible to design multi-layer composite sheets with widely customizable stiffness and strength properties to suit almost any application—from vehicle fenders and fascias to aircraft panels, appliance housings, etc. The material layup 100 may be left as an uncured pre-preg sheet and used in a subsequent forming process.

One or more of the skeletons 72 in the material layup 100 may include an electrical or electronic connection 110. The electrical connection 110 could be useful when the skeleton 72 to which it is attached is comprised of an electrically conductive material such as a metal. In such a case, the skeleton 72 could be an antenna element sending/receiving signals on the connection 110. The skeleton 72 could be an electromagnetic interference (EMI) shield "cage" which is grounded via the connection 110. In another example, the skeleton 72 could be a heating element which receives an electrical current on the connection 110. The connection 110 is not required for applications in which the skeletons 72 do not serve an electrical/electronic function, but such electrical/electronic functions illustrate the wide range of features and applications possible with the material layup 100 including one or more of the skeletons 72.

Figures 12, 13, 14:
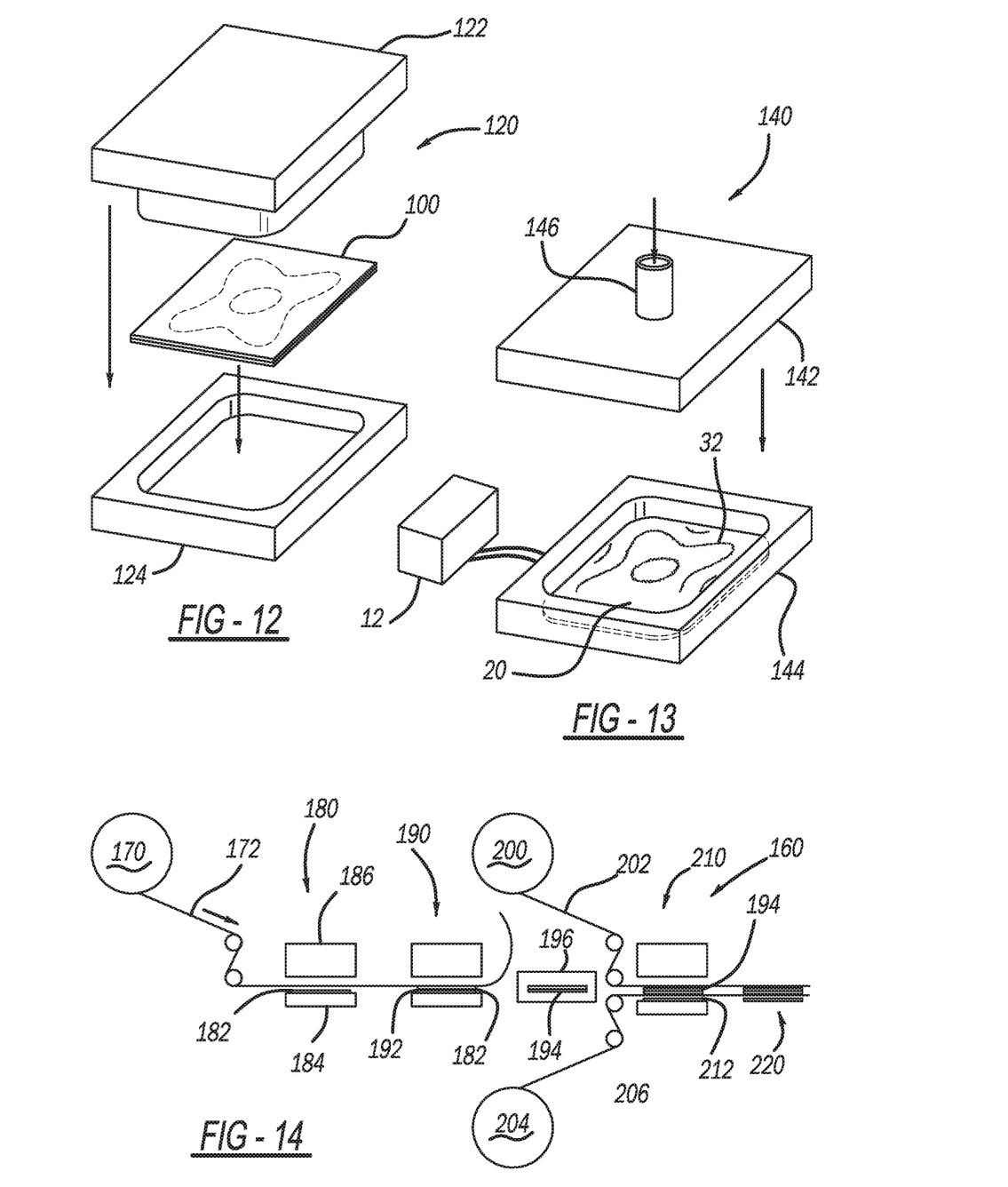
FIG. 12 is an illustration of a molding process using one of the composite material layups of FIGS. 9-11.
FIG. 13 is an illustration of an injection molding process including a cymatics apparatus with a resonating plate in the lower mold half for producing a nodal line pattern directly in the part being molded.
FIG. 14 is an illustration of a manufacturing process where multiple cymatics apparatus stations are used to create different nodal line patterns and each pattern is captured on a continuous sheet of a working material.

FIG. 12 is an illustration 120 of a molding process using one of the composite material layups of FIGS. 9-11. This discussion will refer to the layup 100—but the layup 80 or 90 may also be used. As discussed above, the layup 100 (or 80 or 90) may have any suitable number of layers and embedded skeletons 72, and the matrix layers may be comprised of any suitable moldable material. An upper mold 122 mates with a lower mold 124, capturing a sheet of the layup 100 therebetween to form a final shape—such as the shapes of the applications described above with reference to FIG. 11. After the mold halves 122/124 are brought together to form the layup 100 into the desired shape, the entire apparatus would likely be heated to activate the resin in the layup 100 and cause the layup 100 to harden or cure into its final, permanent shape. Because of the embedded skeleton(s) 72 and the resultant ridges and troughs in the matrix layers, the finished product made from the layup 100 will have improved stiffness and strength properties as compared to a conventional sheet molded material without the embedded skeletons.

FIG. 13 is an illustration of an injection molding process 140 including a cymatics apparatus in the lower mold half for producing a nodal line pattern directly in the part being molded. An upper mold half 142 and a lower mold half 144 are provided which define a cavity therein for injection molding a part. The upper mold half 142 includes an inlet port 146 for introducing the liquid polymer or other liquid form of the material to be molded. The tone generator 12 and the resonating plate 20 (along with the speaker 14, not shown) are used as discussed earlier to produce the nodal line pattern 32 in the cavity of the lower mold half 144, where the resonating plate 20 forms the bottom surface of the lower mold half 144. When the plate 20 is resonating and the particles 30 have formed the nodal line pattern 32, the liquid polymer is injected into the inlet port 146 to fill the mold cavity and form the part. The part then includes the particles 30 in the shape of the nodal line pattern 32, where the part can then be used for electrical/electronic applications (if the particles 30 are metallic), structural application, etc.

FIG. 14 is an illustration 160 of a manufacturing process where multiple cymatics apparatus stations are used to create different nodal line patterns and each pattern is captured on a continuous sheet of a working material. In this continuous sheet processing application, multiple different nodal line patterns can be created and superimposed upon each other.

A roll 170 provides a continuous feed of a first pick-up sheet 172. The first pick-up sheet 172 is a sticky material to which the particles 30 will adhere when pressed into contact. The first pick-up sheet 172 passes through a first cymatics station 180 where a first nodal line pattern 182 is produced by a resonating plate 184 and a vibration source 186, where the vibration source 186 performs the functions of the tone generator 12 and the speaker 14 discussed previously. At the first cymatics station 180, the first nodal line pattern 182 is produced and the first pick-up sheet 172 is applied to the first resonating plate 184 to capture the first nodal line pattern 182 on the first pick-up sheet 172. At a second cymatics station 190, a second nodal line pattern 192 is created and superimposed upon the first nodal line pattern 182 which is moved into position on the first pick-up sheet 172. The second cymatics station 190 (and subsequent stations) may use a different frequency and/or a different resonating plate shape to create nodal line patterns which are different from the first nodal line pattern 182.

In one embodiment, the two nodal line patterns are different, thereby creating a uniquely customized combined nodal line pattern by superimposing the second nodal line pattern 192 upon the first nodal line pattern 182. In one example application, the particles 30 are grains of sand and the first pick-up sheet 172 with the superimposed nodal line patterns could be used as sandpaper (either individual sheets or belt sander rolls), where the nodal line patterns 182 and 192 provide improved sanding properties compared to uniform grit distribution.

In another application, the first pick-up sheet 172 could be further processed to produce an end product with customized structural and/or electrical properties based on the superimposed nodal line patterns. For example, the portion of the first pick-up sheet 172 containing the first nodal line pattern 182 and the second nodal line patterns 192 could be trimmed to produce a component 194, which is inverted and placed in an oven 196 to melt the particles in the nodal line patterns 182 and 192 into a solid skeleton. A roll 200 provides a continuous feed of a second pick-up sheet 202, and a roll 204 provides a continuous feed of a third pick-up sheet 206. At a third cymatics station 210, the component 194 is laminated between the second pick-up sheet 202 and the third pick-up sheet 206, and a third nodal line pattern 212 is also produced and applied to the third pick-up sheet 206. The result of the processing steps shown in FIG. 14 is a part 220 which included three (potentially all different) nodal line patterns and three pick-up sheets. The part 220 will have uniquely customized stiffness and strength properties (and/or electrical properties) based on the nodal line pattern shapes and the types of material used in the pick-up sheets.

FIG. 14 illustrates one example of a multi-station continuous processing apparatus for nodal line pattern capture. Many other multi-station processes are possible—including processes using different numbers of continuous sheets and different lamination configurations, different numbers of pattern-generation stations, etc.

Figure 15:
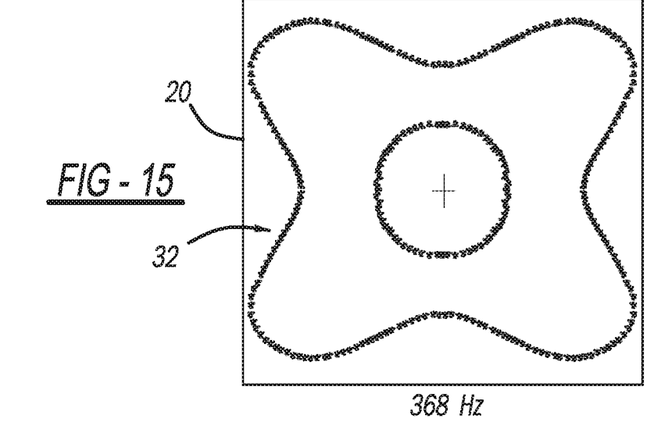
FIG. 15 is an illustration of a resonating plate and the nodal line pattern which is produced by a tone at a relatively low frequency of 368 Hz.
Figure 16:
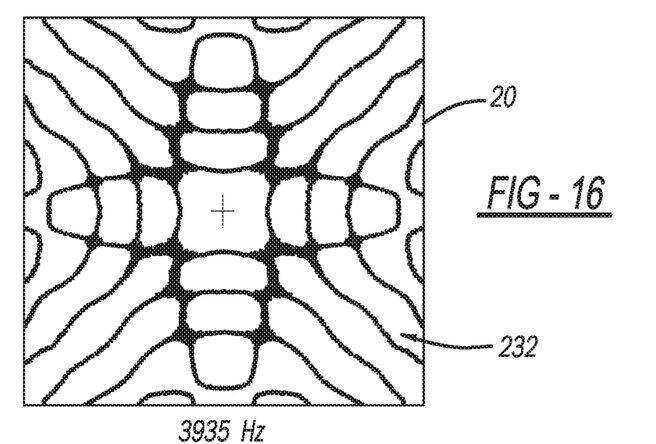
FIG. 16 is an illustration of the resonating plate of FIG. 15 and the nodal line pattern which is produced by a tone at a mid-range frequency of 3935 Hz.
Figure 17:
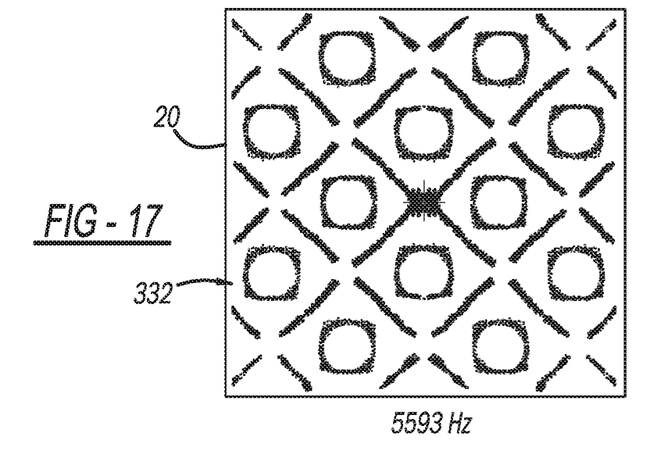
FIG. 17 is an illustration of the resonating plate of FIG. 15 and the nodal line pattern which is produced by a tone at a higher frequency of 5593 Hz.

FIG. 15 is an illustration of the resonating plate 20 and the nodal line pattern 32 which is produced by a tone at a relatively low frequency of 368 Hz. FIG. 16 is an illustration of the resonating plate 20 and a nodal line pattern 232 which is produced by a tone at a mid-range frequency of 3935 Hz. FIG. 17 is an illustration of the resonating plate 20 and a nodal line pattern 332 which is produced by a tone at a higher frequency of 5593 Hz. It is noted that using the same resonating plate 20, completely different nodal line patterns are produced by different resonant frequencies.

FIGS. 15-17 illustrate how dramatically different shapes may be produced and captured by the techniques described above. It is also noted that some frequencies (such as shown in FIG. 16) produce nodal line patterns in which the entire shape (or nearly so) is one fully-interconnected web, thus simplifying subsequent processing of the skeleton, and also enabling the electrical/electronic applications discussed earlier. For the given shape of the resonating plate 20, still other natural frequencies exist, with further variety in the nodal line pattern shapes. Many different plate shapes may also be used, thus leading to an even greater variety of nodal line pattern shapes.

As will be well understood by those skilled in the art, the several and various steps and processes discussed herein to describe the disclosed methods may be referring to operations performed by a computer, a processor or other electronic calculating device that manipulate and/or transform data using electrical phenomenon. In particular, this refers to the control of the resonant frequency produced by the tone generator 12, which may in fact be a computer with a processor. The manufacturing processes described and shown in FIGS. 12-14 may also be controlled by computer/processor. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The capture and processing of cymatics-generated nodal line patterns discussed above offers simple and cost-effective creation of intricate and highly customizable shapes. These shapes can be used in a nearly endless array of applications to provide the structural or electrical/electronic properties needed to meet the requirements of the particular usage.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A system for capturing nodal line pattern shapes produced by a vibrating plate, said apparatus comprising:
   a vibration source;
   a resonating plate in proximity to the vibration source, where the resonating plate is oriented in a horizontal plane and fixed at a constraint location of at least one point;
   a particulate material placed on a top surface of the resonating plate, wherein, when the vibration source is activated at a resonant frequency of the resonating plate, the resonating plate vibrates in a shape having a nodal line pattern which includes locations on the plate with zero amplitude vibration, and the particulate material collects in the nodal line pattern; and
   means for capturing the particulate material in the shape of the nodal line pattern for removal from the resonating plate and further usage in a structural or electrical application, including a pick-up sheet of a tacky material which is lowered into contact with the top surface of the resonating plate to capture the particulate material in the shape of the nodal line pattern.

2. The system according to claim 1 wherein the vibration source is atone/signal generator electrically coupled to a speaker, where the speaker produces an aural tone at the resonant frequency.

3. The system according to claim 1 wherein, after inverting, the pick-up sheet is removable from the resonating plate to provide the particulate material in the shape of the nodal line pattern on top of the pick-up sheet, and a heat source is applicable to fuse the particulate material into a solid skeleton.

4. The system according to claim 1 wherein the particulate material is grains of sand and the application is using the pick-up sheet as sandpaper.

5. The system according to claim 1 further comprising one or more additional resonating plates, each with its own vibration source, where each of the resonating plates produces a different nodal line pattern, and where a continuous feed sheet of tacky material captures the particulate material in the shape of the nodal line pattern from each of the resonating plates in sequence.

6. A system for capturing nodal line pattern shapes produced by a vibrating plate, said apparatus comprising:
   a tone/signal generator;
   a speaker electrically coupled to the tone/signal generator, where the speaker produces a sound at a frequency dictated by the tone/signal generator;
   a resonating plate in proximity to the speaker, where the resonating plated is oriented in a horizontal plane and fixed at a center point of the plate;
   a particulate material placed on a top surface of the resonating plate, wherein, when the speaker produces the sound at a resonant frequency of the resonating plate, the resonating plate vibrates in a shape having a nodal line pattern which includes locations on the plate with zero amplitude vibration, and the particulate material collects in the nodal line pattern;
   a supply of pick-up sheets of a tacky material which are lowered into contact with the top surface of the resonating plate to capture the particulate material in the shape of the nodal line pattern; and
   a heat source configured for application to the resonator plate with the particulate material in the shape of the nodal line pattern to fuse the particulate material into a solid skeleton.

7. The system according to claim 6 further comprising a mold configured to receive one or more of the solid skeletons along with layers of other materials comprising a pre-impregnated layup sheet which is formed in the mold and cured to produce a finished product with strength and stiffness properties determined in part by the shape of the nodal line pattern embodied in the one or more solid skeletons.

8. A method for capturing nodal line pattern shapes produced by a vibrating plate, said method comprising:
   providing a resonating plate in proximity to a vibration source, where the resonating plated is oriented in a horizontal plane and fixed at a constraint location of at least one point;
   placing a particulate material on a top surface of the resonating plate;
   activating the vibration source, wherein, when the vibration source is activated at a resonant frequency of the resonating plate, the resonating plate vibrates in a shape having a nodal line pattern which includes locations on the plate with zero amplitude vibration, and the particulate material collects in the nodal line pattern; and capturing the particulate material in the shape of the nodal line pattern for removal from the resonating plate and further usage in a structural or electrical application, including lowering a pick-up sheet of a tacky material into contact with the top surface of the resonating plate to capture the particulate material in the shape of the nodal line pattern.

9. The method according to claim 8 wherein capturing the particulate material in the shape of the nodal line pattern further includes inverting the resonating plate with the pick-up sheet attached, removing the resonating plate to provide the particulate material in the shape of the nodal line pattern on top of the pick-up sheet, and applying a heat source to fuse the particulate material into a solid skeleton.

10. The method according to claim 9 further comprising combining one or more of the solid skeletons with layers of other materials to produce a pre-impregnated layup sheet which is formed in a mold and cured to produce a finished product with strength and stiffness properties determined in part by the shape of the nodal line pattern embodied in the one or more solid skeletons.

11. The method according to claim 9 wherein the particulate material is metallic and the skeleton is coupled to an electrical wire and configured for use as an antenna, an electromagnetic interference (EMI) shield or a heating element.

12. The method according to claim 8 further comprising providing one or more additional resonating plates, each with its own vibration source, where each of the resonating plates produces a different nodal line pattern, and providing a continuous feed sheet of tacky material which captures the particulate material in the shape of the nodal line pattern from each of the resonating plates in sequence.

* * * * *